US011193889B2

(12) United States Patent
Li et al.

(10) Patent No.: US 11,193,889 B2
(45) Date of Patent: Dec. 7, 2021

(54) FOURIER TRANSFORM PHOTOLUMINESCENCE SPECTROMETER

(71) Applicant: INSA OPTICS TECHNOLOGY(SHANGHAI) LTD., Shanghai (CN)

(72) Inventors: Jihua Li, Shanghai (CN); Jun Shao, Shanghai (CN)

(73) Assignee: INSA OPTICS TECHNOLOGY (SHANGHAI) LTD., Shanghai (CN)

( * ) Notice: Subject to any disclaimer, the term of this patent is extended or adjusted under 35 U.S.C. 154(b) by 0 days.

(21) Appl. No.: 16/940,322

(22) Filed: Jul. 27, 2020

(65) Prior Publication Data

US 2021/0055221 A1 Feb. 25, 2021

(30) Foreign Application Priority Data

Aug. 21, 2019 (CN) .......................... 201910775040.6

(51) Int. Cl.
*G01N 21/64* (2006.01)

(52) U.S. Cl.
CPC ... *G01N 21/645* (2013.01); *G01N 2021/6471* (2013.01); *G01N 2201/06113* (2013.01)

(58) Field of Classification Search
CPC ......... G01N 21/645; G01N 2021/6471; G01N 2201/06113; G01N 21/01; G01N 21/39; G01J 3/4535
See application file for complete search history.

(56) References Cited

U.S. PATENT DOCUMENTS

2011/0318844 A1* 12/2011 van de Voort ....... G01N 21/274
436/163

OTHER PUBLICATIONS

Shao et al. ("Modulated photoluminescence spectroscopy with a step-scan Fourier transform infrared spectrometer," Review of Scientific Instruments vol. 77, p. 063104-1, 2006) (Year: 2006).*

* cited by examiner

*Primary Examiner* — David P Porta
*Assistant Examiner* — Meenakshi S Sahu
(74) *Attorney, Agent, or Firm* — Dragon Sun Law Firm, PC; Jinggao Li, Esq.

(57) ABSTRACT

A compact and miniaturized Fourier transform photoluminescence (PL) spectrometer is provided comprising five functional modules, which are all mounted on a same baseplate: (i) a sample placement module for positioning and spatially adjusting the sample to be tested, which includes a 3-axis stage (10) and a position mark (11) for the expected front surface of the sample being tested. The stage is employed for positioning the sample directly or a low-temperature optical cryostat that contains the sample (said sample and cryostat being not parts of the spectrometer), the position mark indicates the pre-aligned position for the projection of the sample's front surface in the horizontal plane; (ii) a built-in pump light source module for generating PL signal, which includes two lasers (20) and (21) with different laser wavelengths, the lasers' output can be selected on request in the wavelength range from ultraviolet to near-infrared.

9 Claims, 1 Drawing Sheet

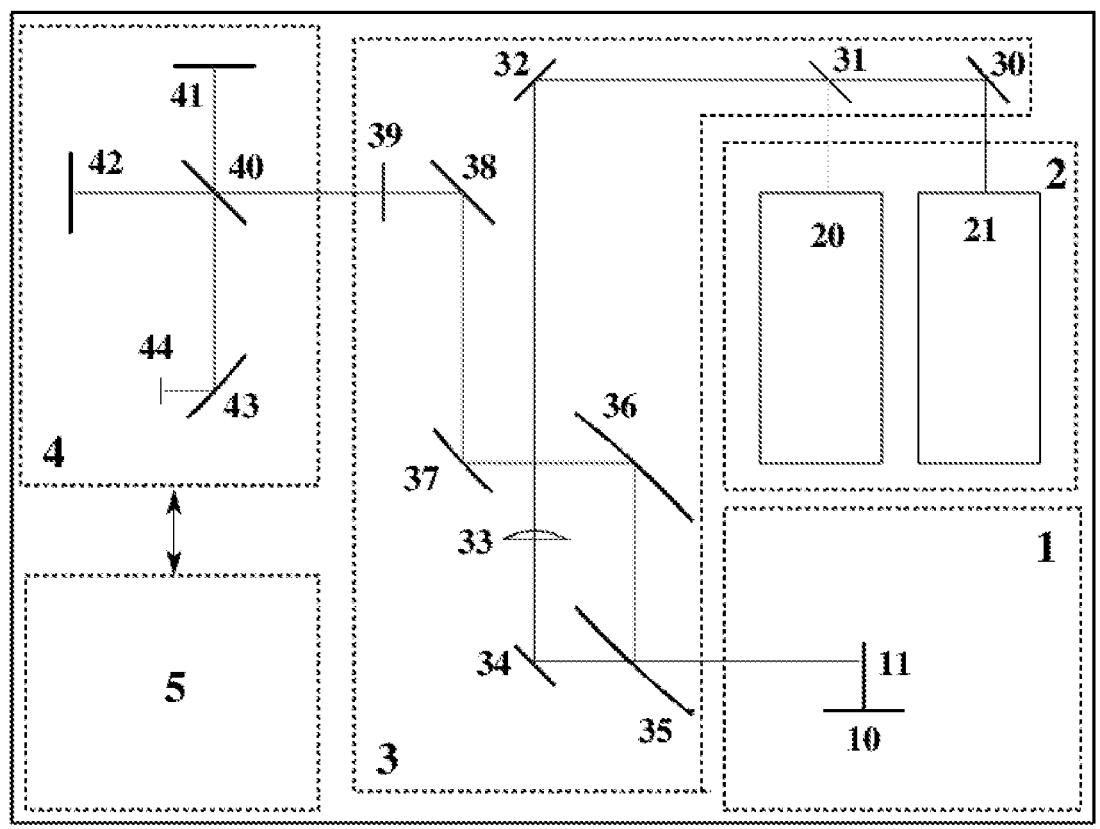

FOURIER TRANSFORM PHOTOLUMINESCENCE SPECTROMETER

CROSS-REFERENCE TO RELATED PATENT APPLICATION

This application claims priority to and the benefit of 201910775040.6, filed Aug. 21, 2019, entitled "Fourier transform photoluminescence spectrometer," by JIHUA L I et al. The entire disclosure of the above-identified application is incorporated herein by reference.

FIELD OF THE INVENTION

The present invention relates to a spectroscopic instrument, and in particular to a Fourier transform photoluminescence (PL) spectrometer for the detection of PL.

BACKGROUND OF THE INVENTION

Photoluminescence is as a powerful non-destructive spectroscopy widely used for semiconductor characterization. It can not only reveal the electronic band structures such as band gap and band-tail states of the semiconductor materials, but also provide information on impurities and deep level defects, thereby greatly deepens the understanding of the optoelectronic properties of the materials. Fourier transform spectroscopy is well established in sophisticated theory and instruments for distinguishing the diverse characteristics of materials and devices. In contrast to the conventional dispersive spectrometers, Fourier transform spectrometer possesses the advantages of multiplex, throughput, low-equivalent noise, and fast scanning, and hence serves as an effective method and the best choice in many fields. Fourier transform spectrometer is typically designed for absorption- or reflection-like spectroscopic measurements with an internal broadband light source. For other functional applications, an emission port is introduced that can characterize emission spectra such as PL.

Fourier-transform PL measurements have been realized in laboratory based on a Fourier transform spectrometer and PL methodology, especially in the long-wavelength spectral region and for weak signal situation that traditional dispersive spectrometer can hardly work: while continuous-scan Fourier transform spectrometer can detect relatively strong PL signal in the visible and near-infrared; the combination of step-scan Fourier transform spectrometer with phase sensitive detection is functional in eliminating environmental thermal-emission interference and realizing PL test in the mid- and far-infrared.

Even so, and there are also many related patents, the application of PL spectroscopy is still significantly restricted by technical limitations. The conventional dispersive spectrometer-based PL spectroscopic system is inferior in weak signal detection and infrared capability due to the use of slit and dispersive device. The reported Fourier transform PL spectroscopic equipment is not an integrated spectrometer but a loose combination of a Fourier transform spectrometer with external pump source and optical path, which is poor in portability and promotion. The optical path is uncertain for PL generation, transmission and collection, difficult to optimize, and susceptible to be interfered, which is not conducive to weak PL detection and variable condition regulation.

CN109030427A describes a CCD spectrometer for PL spectroscopy, which consists of an entrance slit, a collimating mirror, a grating, an imaging mirror and a CCD detector, by providing a telescopic type between the CCD detector and the imaging mirror. The low reflectivity traps the baffle and adjusts the position according to the wavelength of the excitation peak to ensure that the excitation peak is blocked and only the emission peak is passed, thereby increasing the quality of the PL spectrum measured and realizing accurate measurement of low quantum-efficiency substance. It is based on a dispersive spectrometer rather than a Fourier-transform spectrometer. The use of slits severely constrains the light-passing efficiency, and in turn significantly affects the sensitivity and signal-to-noise ratio of PL spectroscopy. The use of CCD detectors on the other hand limits its applicable spectral range.

CN101949845A discloses a PL scanning system which is composed of a laser, a coupling device, a fiber coupler, an electric sample stage, a spectrometer, and a controller. By using an optical fiber path and a spectrometer of dispersive device and CCD detector, PL measurement and miniaturization of the system are realized. It is based on a combination of dispersive device and CCD detector rather than a Fourier transform spectrometer, and the application of fiber optical path and CCD detector limits the applicable spectral range.

CN105911029B describes a system for measuring PL under low temperature and strong magnetic field, of which the components include a fiber laser, a fiber component, an optical fiber, a vacuum sealed joint, a sample to be tested, a magnetic transport sample chamber, a spectrometer, and a computer. The main feature is the use of fiber components for PL testing of samples in low temperature and strong magnetic-field environments. There is, however, no specific description of the spectrometer type. Furthermore, it is an experimental system that loosely combines different instruments, rather than a compact and integrated PL spectrometer.

CN100424499C discloses a method and a set-up for infrared modulated PL, based on step-scan Fourier transform infrared spectrometer, which comprises Fourier transform infrared spectrometer, a laser, a set of lock-in amplifier and mechanical chopper, and achieves improvements of eliminating Fourier-frequency, internal laser and environmental thermal-emission disturbances, and enhancing infrared PL detection capability. Nevertheless, it is, rather than an integrated PL spectrometer, an experimental system of combining different instruments.

U.S. Pat. No. 6,377,340B1 describes a PL spectroscopic method for detecting whether a natural diamond has been processed at high pressure and high temperature conditions, which comprises steps of disposing the diamond in a cryostat that is provided at temperatures equal to or less than liquid nitrogen; illuminating the diamond with a laser beam; recording an optical spectrum of the diamond with a PL spectrometer; and examining the optical spectrum of the diamond to detect an absence of selected PL spectral lines. The main feature is to provide a PL spectroscopic evaluation method for diamond processing conditions, without any specific description about the PL spectrometer type/operation mode, so it belongs to a diamond spectrum evaluation method that is loosely combined by different instruments, rather than an integrated PL spectrometer.

U.S. Pat. No. 5,499,095A concerns an optical or infrared Fourier spectrometer with a plurality of entrances and exits for the coupling on of external sources or samples, and the entrances can also be used as exits and vice versa. It does not touch on PL spectroscopy, and is neither a PL spectrometer.

US2011189787A1 provides a PL spectrometer comprising: a source of electromagnetic radiation for exciting PL in a sample, a site for location of the sample, a detector for detecting PL emitted from the sample, and a means of varying the intensity received by the detector of electromagnetic radiation having the same wavelength as the excitation radiation. It does not involve Fourier transform interferometer, nor include off-axis parabolic mirror-based optical path for optimized PL signal collection, transmission and input to interferometer. It is not a Fourier transform PL spectrometer.

U.S. Pat. No. 5,309,217A discloses a Fourier transform infrared spectrometer with a two-beam interferometer with which the mirror drive is realized via two retroreflectors which are located on two 180° displaced arms of a double pendulum. Deflecting mirrors are arranged between the beam splitter and the retroreflectors. The beam splitter is displaced with respect to the plane of the pendulum. Thereby, a stable, easily aligned, and compact configuration is achieved. The distinct point of the invention is to provide a stable, easy to align and compact Fourier spectrometer configuration. It does not involve PL spectroscopy, and is neither a PL spectrometer.

U.S. Pat. No. 9,121,755B2 introduces a novel emission and transmission optical spectrometer. The beneficial aspects are a single sample compartment as confined within the walls of the spectrometer housing, a more compact accessory, and the capability of making both emission (e.g., Raman and Fluorescence) and infrared transmission measurements at designed sample points. It does not include the pump source and associated optical path that generates the emission, and is neither a Fourier transform PL spectrometer.

Therefore, a heretofore unaddressed need exists in the art to address the aforementioned deficiencies and inadequacies.

SUMMARY OF THE INVENTION

To resolve the above problems, the purpose of the present invention is to disclose a compact and miniaturized Fourier transform PL spectrometer, which possesses the characteristics of interferometer-based, integrated with built-in pump light lasers, pre-aligned and adjustment-free optical path with high optical efficiency, and turn-key for PL measurement soon as the sample being placed against the position mark. The spectrometer eliminates the limitations in the conventional PL measurement that the PL measurement is very demanding on user's experimental skills, the optical path is hard to optimize while easy to deviate, and the PL signal is weak and difficult to resolve. It will therefore find wide applications in the fields of physics, materials, microelectronics and optoelectronics.

The technical solution of the present invention is as follows:

A compact and miniaturized Fourier transform PL spectrometer is designed with five modules being integrated on a same baseplate: module 1 for sample placement and position adjustment, which comprises a 3-axis stage for positioning the sample directly or a low-temperature optical cryostat that contains the sample (said sample and cryostat being not parts of the spectrometer), and a position mark for a pre-aligned position for the projection of the sample's front surface in the horizontal plane; module 2 providing built-in pump light sources for generating PL signal, which includes two independent lasers with selectable on request wavelength range from ultraviolet to near-infrared, and realizes effective optical excitation of the sample; module 3 for PL generation, efficient collection and feeding to the interferometer module, which focuses the laser output on to the sample to generate PL signal via flat mirrors, dichroic optical filter, converging lens, and off-axis parabolic mirror with a through hole along the focused beam, collects the PL signal via the off-axis parabolic mirror with a through hole along the focused beam, converges via two off-axis parabolic mirrors, and feeds to the module 4 via a flat mirror and a long-pass optical filter; module 4 is an interferometer for PL signal detection; module 5 for laser control and display, interferometer control and Fourier transform, PL spectral display storage, and external communication via USB ports.

The function of the position mark is to indicate in the horizontal plane the position where the vertical projection of the front surface of the sample is seen during the PL measurement, and the position is pre-optimized to ensure optimal collection of the PL signal.

The flat mirror is used in combination with the dichroic optical filter, the nature of the dichroic optical filter that high transmission in the passband and high reflectivity in the stopband ensures the coexistence and pre-alignment of the optical path with two lasers of different output wavelengths, and warrants on-site selectable laser output without the necessity of adjusting the optical path.

The off-axis parabolic mirror with a hole in the center of the converging beam direction ensures that be co-axial of the pump laser onto the sample and the collected PL beam via the mirror opening. The numerical aperture is selected to maximize the collection of the PL signal.

The effect of the two off-axis parabolic mirrors for light beam conversion is that, while a large-aperture parabolic mirror is used for collecting PL signal, an interferometer with small clear aperture can be used for minimizing the size of the spectrometer.

The interferometer meets the resolution requirement of the PL measurement, with a small clear aperture design so far possible to ensure the PL spectrometer be compact, and with selectable beam splitter (of, as example not limited to, $CaF_2$ or ZnSe) and photodetector (of, as example not limited to, Si, InGaAs or HgCdTe) for a functional spectral band in the near- to mid-infrared.

The module 5 implements laser output control and display, interferometer control and Fourier transform calculation, PL spectral display and storage, and external communication via USB ports.

Compared with the available techniques, the beneficial effects of the present invention include:

1. The present invention provides an integrated Fourier transform PL spectrometer based on an interferometer and pumping light sources, which effectively avoids the on-site difficulties of optical path tuning and weak PL signal detecting, makes PL measurement easy to operate, and thereby improves significantly the effective applicability of the PL spectroscopy.

2. The present invention implements, based on dichroic optical filter, a pre-aligned and optimized optical path with two built-in lasers of different output wavelengths, which ensures change of pump laser wavelength without the necessity of on-site adjusting the optical path.

3. The present invention utilizes position mark for the sample to indicate the optimized position of the front surface of the sample, thereby ensures convenient and optimal collection of the PL signal.

4. The present invention adopts a beam-conversion configuration with two off-axis parabolic mirrors, which warrants a large-aperture parabolic mirror be used for collecting PL signal without sacrificing the collection efficiency, while an interferometer with small clear aperture be acceptable for minimizing the size of the spectrometer.

5. The present invention employs an interferometer rather than a conventional dispersive device for spectral analysis, which utilizes the multiplex and throughput advantages of the interferometer to improve the utilization efficiency of the PL signal, and hence the sensitivity, spectral resolution and signal-to-noise ratio of the PL measurement.

6. The present Fourier transform PL spectrometer has the functions of laser control and display, interferometer control and Fourier transform, PL spectral display and storage, and external communication via USB ports, and it is thereby integrated, stand-alone, and compact.

The present invention has the characteristics of compact with two built-in pump-light lasers, pre-aligned and on-site adjustment-free with high optical efficiency, and turn-key for PL measurement with the sample being placed against the position mark. It eliminates the limitations in the conventional PL measurement that the optical path is hard to optimize while easy to deviate, and the PL signal is weak and difficult to resolve, significantly improves the convenience, reliability and weak signal detection capability of the PL measurement, and hence opens a broad prospects for the applications in the fields of microelectronics, optoelectronics, new materials and physics.

BRIEF DESCRIPTION OF THE DRAWING

The accompanying drawing illustrates one or more embodiments of the present invention and, together with the written description, serve to explain the principles of the invention. Wherever possible, the same reference numbers are used throughout the drawings to refer to the same or like elements of an embodiment.

FIG. 1 is the sole drawing and illustrates schematically the optical configuration of the Fourier transform PL spectrometer and pre-optimized position for the sample to be tested.

DETAILED DESCRIPTION

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

In the following, the present invention will be described further in detail with reference to the attached drawings and with particular configuration as example of the 5 functional modules.

FIG. 1 is a schematic illustration of the optical configuration of the Fourier transform PL spectrometer and the pre-optimized position for the sample to be tested. As can be seen from the figure, the spectrometer of the present invention is of characteristic that it is comprised with five functional modules, which are mounted on a same baseplate.

Module 1 includes a 3-axis stage and a position mark for the sample to be measured. The stage is employed for three-dimensionally positioning the sample directly placed on the stage or a low-temperature optical cryostat that contains the sample (as the user of PL spectrometer be aware, neither the sample nor the cryostat be a part of the spectrometer), so as to ensure the sample surface (the front surface) to be in a vertical plane and perpendicular to the incident pump laser light; the three-dimensional adjustment horizontally front and back, left and right, and vertically up and down meets the requirement that the sample to be measured can be directly irradiated by the pump laser. The position mark is used to indicate the pre-aligned position for the sample's front surface in the horizontal plane, and the position is pre-optimized with the internal optical path to warrant optimal collection of the PL signal. Considering the luminescent properties of solid-state sample may be significantly improved at low temperatures, cryogenic optical cryostats are often necessary for the use of the spectrometer. For this reason, the space of the module 1 is made compatible to commonly used commercial compact optical cryostats, for example but not limited to, helium-flow optical cryostat system (Oxford Instruments, Microstat-He, or Janis ST-500), or closed-loop refrigerator optical cryostat (Janis SHI-4XG-X).

Module 2 includes two lasers with different output light wavelengths selectable in the ultraviolet-near-infrared band. The module provides built-in pump light, and works together with module 3 to effectively generate PL signal from the sample be measured. The flat mirror and dichroic optical filter in module 3 is used, the dichroic optical filter with high transmission passband and high reflectivity stopband ensures the coexistence and pre-alignment of the optical path with two lasers of different output wavelengths, and warrants on-site selectable laser output without the necessity of adjusting the optical path.

Module 3 includes in sequence a flat mirror, a dichroic optical filter, a second flat mirror, a converging lens (group), a third flat mirror, and an off-axis parabolic mirror with through hole along the center of the converging beam direction. It directs the laser output of module 2 onto the surface of the sample to be tested, and generates PL signal. The PL signal is collected by the off-axis parabolic mirror with a through hole in the center of the converging beam direction, and is beam converged via said two off-axis parabolic mirrors and is fed to the module 4 via the flat mirror and long pass optical filter. The off-axis parabolic mirror with a through hole in the center of the converging beam direction ensures with its opening the excitation laser and the collected PL beam to be co-axial, while the numerical aperture of the off-axis parabolic mirror is selected so as to maximize collection efficiency of the PL signal. The effect of the two off-axis parabolic mirrors for light beam conversion is that, while a large-aperture parabolic mirror is used for collecting PL signal, an interferometer with small clear aperture can be used for minimizing the size of the spectrometer.

Module 4 includes as the main components of an interferometer a beam-splitter, a fixed and a moving mirrors, an off-axis parabolic mirror, and a photodetector. As the resolution requirement of PL spectroscopy is fulfilled, small clear aperture design is preferable to make the Fourier transform PL spectrometer compact and miniaturized. The functional spectral range of the PL spectroscopy depends on the selection of the beam splitter and/or the photodetector, and works in the visible, near- and mid-infrared spectral regions when appropriate beam splitter (of, as example not limited to, $CaF_2$ or ZnSe) and photodetector (of, as example not limited to, Si, InGaAs or HgCdTe) are incorporated.

Module 5 includes as the main components for device control and spectral calculation like laser output control and display; sampling and Fourier transform of PL signal from the interferometer; and data exchange via USB ports. The laser output control and display assembly is used on-site to select a pumped laser and control the output power of the selected laser. The sampling and Fourier transform component realizes the amplification and sampling of the interferometer's output electrical signal (known as interferogram), Fourier transform of the interferogram to PL spectrum, and display and storage of the PL spectrum being measured. The data exchange component is functioned with PL spectral display, storage, and external communication via USB ports.

Based on the above specific implementation of the functional modules, a compact and miniaturized Fourier transform PL spectrometer is realized with built-in pump light lasers, pre-aligned high efficient optical path, and pre-optimized position mark for the sample being measured easily. The spectrometer is easy to operate, makes PL measurement convenient, reliable and capable in weak signal detection, and will thereby promote its application in the fields of microelectronics, optoelectronics, new materials and physics.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A Fourier transform photoluminescence (PL) spectrometer for use in PL spectroscopy, comprising:
   five specific functional modules on a same baseplate of sample placement, built-in pump-light lasers, an optical path, an interferometer, and electronic control and treatment, respectively,
   wherein the module 2 employs a dual laser coexisting optical path based on a combination of a dichroic filter and a flat mirror, and without tuning the optical path different laser wavelength can be selected.

2. The spectrometer according to claim 1, wherein the interferometer is compact and integrated with laser output control and display, interferometer signal sampling and Fourier transform, PL spectrum display and storage, and external communication via USB ports.

3. The spectrometer according to claim 1, wherein the functionality of the five functional modules can be realized with different combination of optical, mechanical and electronic devices: (i) the sample placement module has a 3-axis stage and a position mark for the sample being tested; (ii) the built-in pump-light laser module has two independent lasers with selectable wavelength in the range of UV-NIR; (iii) the optical path module for PL generation consists of flat mirrors, dichroic optical filter, converging lens, off-axis parabolic mirrors with and without a through hole along the focused beam, and long-pass optical filter; (iv) the interferometer module comprises beam splitter, moving mirror, fixed mirror, off-axis parabolic mirror and a photodetector; and (v) the electronic control and treatment module is for laser control and display, interferometer control and Fourier transform, spectrum display and storage, and external communication via USB ports.

4. The spectrometer according to claim 1, wherein the interferometer is used instead of a conventional dispersion device, an integrated arrangement is provided based on the interferometer and the pump-light lasers, and the optical path of said spectrometer is pre-optimized to make PL measurement easy to conduct.

5. The spectrometer according to claim 1, wherein the module 1 uses a mark to indicate a pre-optimized PL position, at which the front surface of the sample should be positioned.

6. The spectrometer according to claim 1, wherein the module 3 uses a combination of a flat mirror, a dichroic filter, a (set of) converging lens, and an off-axis parabolic mirror with a through hole along the focused beam to focus the laser beam onto the surface of the sample being measured, and to generate said PL signal.

7. The spectrometer according to claim 1, wherein the generated PL signal is collected by the off-axis parabolic mirror of module 3 with a through hole.

8. The spectrometer according to claim 1, wherein the module 3 uses two off-axis parabolic mirrors for light beam conversion, and while a large-aperture parabolic mirror is used for collecting PL signal, an interferometer with small clear aperture can be used for minimizing the size of the spectrometer.

9. The spectrometer according to claim 1, wherein the collected PL signal is detected by the interferometer of module 4.

* * * * *